US012177263B1

(12) United States Patent
Tewari et al.

(10) Patent No.: US 12,177,263 B1
(45) Date of Patent: Dec. 24, 2024

(54) SEMI-AUTOMATED ROLE CREATION FOR GOVERNANCE OF MACHINE-LEARNING SYSTEMS

(71) Applicant: Amazon Technologies, Inc., Seattle, WA (US)

(72) Inventors: Ruchir Tewari, Mountain View, CA (US); Sriharsha Mukundappa Sathyavathi, Livermore, CA (US); Prateek Mehrotra, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 324 days.

(21) Appl. No.: 17/656,056

(22) Filed: Mar. 23, 2022

(51) Int. Cl.
*H04L 9/40* (2022.01)
*G06F 16/16* (2019.01)
*G06F 16/28* (2019.01)

(52) U.S. Cl.
CPC .......... *H04L 63/205* (2013.01); *G06F 16/168* (2019.01); *G06F 16/283* (2019.01); *H04L 63/101* (2013.01)

(58) Field of Classification Search
CPC .. G06F 16/2365; G06F 16/168; G06F 16/283; H04L 63/101
See application file for complete search history.

(56) References Cited

U.S. PATENT DOCUMENTS

| | | | | |
|---|---|---|---|---|
| 9,842,218 B1* | 12/2017 | Brisebois | ............... | H04L 63/101 |
| 10,320,624 B1* | 6/2019 | Roth | ..................... | H04L 63/101 |
| 2014/0289207 A1* | 9/2014 | Moloian | ............. | G06F 16/2365 |
| | | | | 707/687 |
| 2014/0289796 A1* | 9/2014 | Moloian | ............... | H04L 63/101 |
| | | | | 726/2 |
| 2014/0289846 A1* | 9/2014 | Moloian | ............... | G06F 21/604 |
| | | | | 726/21 |
| 2014/0298423 A1* | 10/2014 | Moloian | ............... | G06F 16/283 |
| | | | | 726/4 |
| 2022/0035933 A1* | 2/2022 | Qiao | ..................... | G06F 16/168 |

* cited by examiner

*Primary Examiner* — Barbara B Anyan
(74) *Attorney, Agent, or Firm* — Lee & Hayes, P.C.

(57) ABSTRACT

Techniques are disclosed for automatically generating an access envelope that can be used to provide recommended access permissions and access rules for access roles. An access policy automation service may monitor actions requested by a user or system operating within a workflow from computing resources in a computing environment. The service may automatically update an access envelope associated with the user or system with permissions allowing the user or system to perform the requested actions. The envelope can then be used in a role definition to provide appropriate permission to users who may be performing similar operations.

20 Claims, 9 Drawing Sheets

SEMI-AUTOMATED ROLE CREATION FOR GOVERNANCE OF MACHINE-LEARNING SYSTEMS

BACKGROUND

A service provider may operate multiple geographically diverse data centers that provide various types of computing services and resources for customers on a permanent and/or an as-needed basis. These computing services and resources may include data processing resources, data storage resources, networking resources, data communication resources, network services, virtual machine instances, and virtual machine storage services, among others. Customers may use various service provider computing services and resources to implement machine-learning (ML) systems and other complex data-intensive systems. There may be a large number of computing services and resources included in these types of complex systems and such services and resources may be accessed frequently. Moreover, computing services and resources may be frequently added and/or removed from such systems. Due to the complexity of these systems and the frequency at which services and resources within such systems may change, it can be challenging to maintain appropriate access levels for users of such systems while ensuring the security of the computing services and resources configured in such systems.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
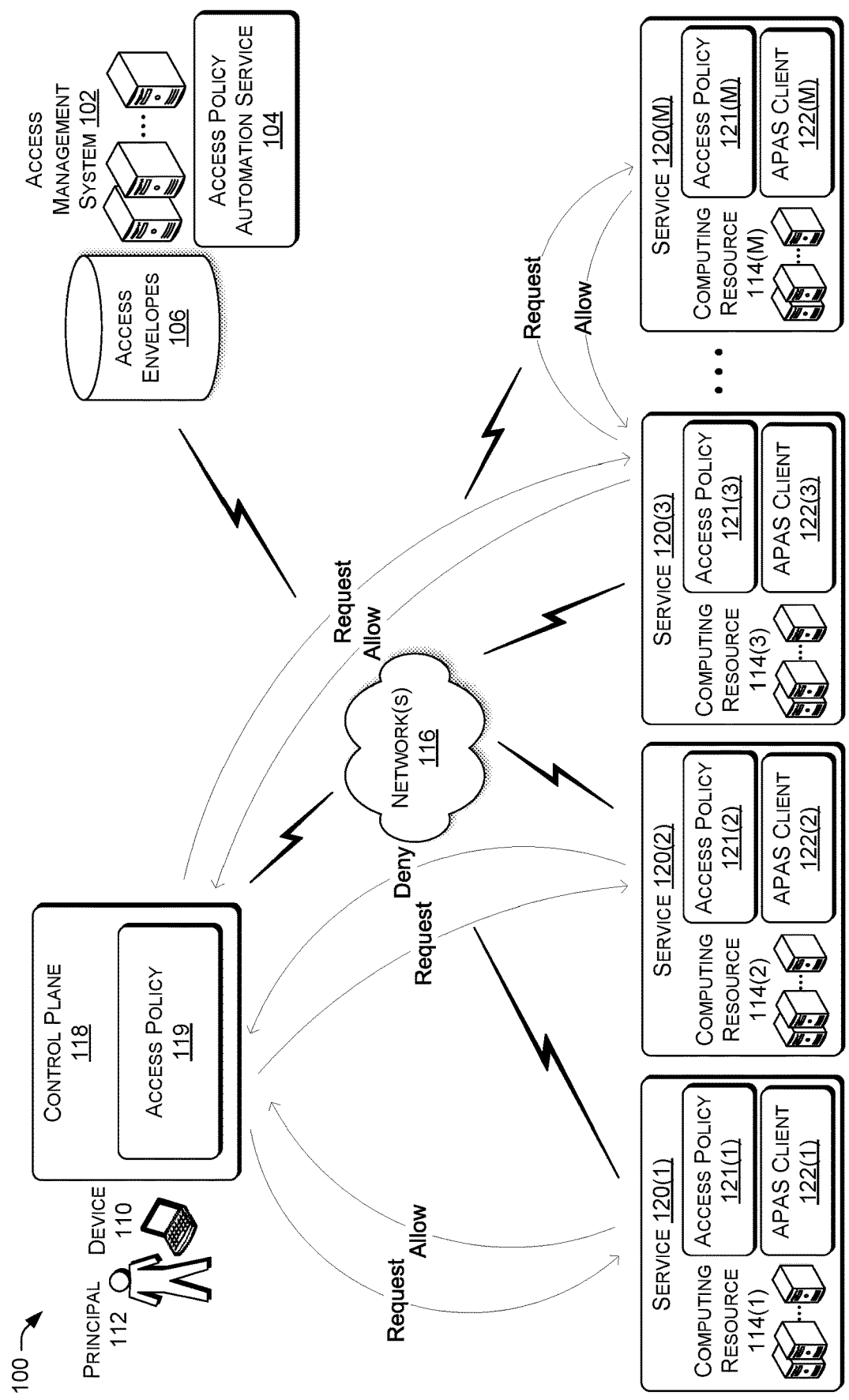
FIG. 1 illustrates a system-architecture diagram of an example environment in which an access management system that includes an access policy automation service (APAS) that monitors actions and generates and modifies access envelopes may be implemented.

Access policies may be used to determine user access to one or more computing services and/or resources. For example, an access policy may allow or deny a user access to a service based at least in part on one or more criteria. In complex systems, such as ML systems and other data-intensive systems, generating accurate and "least-privileged" access policies that are neither too permissive nor too restrictive may be a challenging task. Generating and managing access policies may be done manually using a process of trial and error followed by fine-tuning of such polices as needed. Such manual generation and management of access policies can be time-consuming and may result in overly broad permissions and/or overly narrow permissions, inhibiting proper access and/or comprising system security. It may be challenging to determine the appropriate access policies for a newly implemented complex system because there may be no history of appropriate accesses. For a system with a high frequency of service requests and/or computing resource accesses and changes to the services and/or computing resources configured within the system (e.g., adding and/or removing computing resources), it may be challenging to update and adapt access policies to the frequent changes in the system. This challenge may be compounded by the need for audit and governance of such systems in highly regulated industries, such as finance and healthcare.

In various embodiments, an access policy automation service (APAS) may (e.g., automatically) generate one or more access envelopes associated with a particular workflow, workflow operation, or service. An access envelope may be a data structure containing data that represents access permissions and/or access rules for the particular workflow, workflow operation, service, and/or resource. For example, an access envelope may have permissions for operations that may be performed by a particular role and/or at a particular access level in a system hierarchy. An access envelope may be used as a template or framework for an access policy and/or an access role definition that may define the access permissions and/or access rules that may be assigned to a user or principal. For example, as described in more detail below, an access envelope may be used to generate a customized access role for a user that, for example, will be performing tasks similar to those performed by the principal with which the access envelope is associated. In embodiments, one or more access envelopes may be integrated into one or more other envelopes and/or be a component of one or more other envelopes. For example, a particular envelope for a first role may be included in another envelope for a second role, where the second role has expended access beyond that of the first role. Also, or instead, one user or role may be associated with more than one access envelope.

An APAS may dynamically generate one or more access envelopes by monitoring actions initiated and/or associated with a principal (e.g., a user; a user in a particular access role; a user's device; a system that initiates an action, operation, or workflow, etc.) to track these actions and the associated resources and services. An action may be a request for a service, a call to an application programming interface (API), a request for access to a computing resource, a request to add, delete, or modify data at a computing resource, a request that a computing resources perform one or more operations, a particular workflow operations, or any other operation or function that may be initiated by or associated with a principal. The APAS may classify the detected actions and generate and store data associated with these actions. For example, the APAS may store action data representing an associated workflow, service, one more resources, the associated principal, and/or a result of the action (e.g., access denied, access allowed). The APAS may obtain action data from a system control plane with which the principal is interacting and/or from APAS clients configured on the computing resources associated with the action.

The APAS may establish an initial access envelope for a particular principal, role, and/or operator operating at a particular level in a system hierarchy and then modify the access envelope based on action data obtained from monitoring actions involving the principal. For example, the APAS may generate an initial access envelope for a principal associated with a particular workflow or workflow operation involving a set of one or more particular services. This access envelope may serve as a model representing the access permissions or rules that may be used during the particular workflow operation and across various services and resources. The APAS may then grow and/or prune the permissions represented by the access envelope as it monitors the principal (e.g., repeatedly) participating in the workflow operation. For example, the APAS may add a permission for a particular resource and/or service based on detecting a denial of access to that resource for the principal. In another example, the APAS may remove a permission for a particular resource and/or service based on not detecting an action associated with such a resource and/or service and the principal (e.g., not detecting the action for at least a threshold length of time, not detecting the action for at least a threshold number of workflow operations, determining that the action is no longer part of the workflow or workflow operation, etc.).

In various examples, detected actions may be included in a hierarchical series of actions. For example, a principal participating in a workflow operation may initiate an action that causes a first computing service or resource to initiate a second action at a second computing service or resource. In such examples, an APAS may associate the second action with the principal despite the second action not being initiated by the principal because the second action is part of the same workflow operation in which the principal is participating and that resulted in the second action being initiated by the first computing service or resource.

An access envelope may be used to create one or more customized access roles. In various embodiments, an APAS receive a request for an access role recommendation and may provide an access envelope, or one or more access permissions and/or access rules represented therein, in response as a recommendation of permissions to be associated with a role. For example, an APAS may receive or determine one or more role criteria (e.g., a workflow, a workflow operation, a principal, a service, and/or any other data that may be associated with an access envelope). The APAS may query an access envelope database or data store to determine one or more access envelopes that correspond to the role criteria and return such one or more envelopes in response to the role recommendation request. A customized role may be generated based on this recommendation. In various embodiments, this customized role may be compared against similar roles and/or workflow operation passes for correctness and suitability.

Access envelope data may also, or instead, be compared to existing access policies and/or permissions in use in the same or other environments to determine evaluate such policies and/or permissions. Access envelope data may then be used to improve such existing policies and/or permission by, for example, adding permissions reflected in an access envelope to an existing access policy associated with a similar operation or workflow and/or removing permissions from an existing policy that are not included in an access envelope associated with a similar operation or workflow.

The techniques and systems described herein may be implemented in a number of ways. Example implementations are provided below with reference to the following figures.

FIG. 1 is a block diagram of an illustrative environment 100 that includes an access management system (AMS) 102 that may be configured to implement identity and access functions. The AMS 102 may include an access policy automation service (APAS) 104 configured to dynamically generate and update one or more access envelopes. Access envelopes may be associated with a workflow, workflow operation, and/or a principal. As used herein, the term "principal" may be representative of a user or a role and/or a device or system operated by or otherwise associated with a user or a role. The APAS 104 may store access envelopes in an access envelope data store 106. The AMS 102 may be communicatively connected to one or more networks 116 that may facilitate wired and/or wireless communications with one or more other devices. The AMS 102 may facilitate communication between the APAS 104 and one or more computing resources, services, and/or principals.

An access envelope may include permissions associated with one or more actions that may be performed by a user, system, or device. For example, an access envelope may include permissions for access to one or more computing resources and/or permissions to interact with one or more services that control or otherwise manage one or more computing resources (e.g. computing resource access permissions, such as permissions to read, write, modify, and/or delete data stored on the resource). Such permission may also, or instead, include permissions to initiate actions using one or more services and/or executed on one or more computing resources. For example, an access envelope may indicate that one or more particular API calls and/or service requests are permitted to made to a particular service. Such a service may control or manage a particular computing resource or combination of resources representing a virtual computing resource (e.g., a virtual machine).

The APAS 104 may generate an access envelope based on the actions performed by a principal associated with that envelope. For example, the APAS 104 may be configured to generate an access envelope for a principal 112 that may be operating a computing device 110 (e.g., a desktop computer, a laptop computer, a mobile telephone, a tablet computing devices, etc.) to interact with a control plane 118. The control plane 118 may provide an interface and/or a means of operating or controlling a complex data-intensive system, such as an ML system, and may allow the initiation of operations and workflows on the system.

The APAS 104 may configure an initial access policy 119 at the control plane 118 containing an initial set of permissions controlling access for the principal 112. Alternatively, the access policy 119 may be initially configured at the control plane 118 by a separate entity or system (e.g., an administrator).

The access policy 119 may assign the principal 112 to a role associated with a set of permissions. Alternatively the access policy 119 may assign particular permissions to the principal 112 and/or the device 110 (e.g., without assigning a particular role). The initial set of permissions in the access policy 119 for the principal 112 may be (e.g., substantially completely) permissive or (e.g., substantially completely) restrictive. Alternatively, the initial set of permissions in the access policy 119 for the principal 112 may include an intermediate level of access, for example, based on the initially expected actions of the principal 112. In various embodiments, the APAS may then monitor the actions taken by the principal (e.g., as detected at the control plane 118) to modify and update the access envelope associated with the principal 112.

In various embodiments, the initial access policy 119 may be broadly permissive. An example broad access policy may include one rule or permission (e.g., "*/*") allowing the principal to perform many (e.g., any) actions involving computing resources in the environment 100. In some embodiments, permissions from an initial broad access policy 119 may also be configured in the access envelope associated with the principal 112. In other embodiments, the initial permissions in the access policy 119 may not be configured initially in an access envelope associated with the principal 112, but may be used in the access policy 119 to allow the principal 112 to perform actions that may be detected for the purposes of generating permissions for such an access envelope.

The principal (e.g., via the device 110 and the control plane 118) may interact, directly or indirectly, with one or more services 120(1)-(M) associated with one or more of computing resources 114(1)-(M) (e.g., server computers, virtual machines, software resources, databases, notebooks, clusters, datasets, etc.; hereinafter "resources"), via the one or more networks 116. This interaction may take the form of the initiation of a workflow and/or operation by the principal via interaction with the control plane 118. The resources 114(1)-(M) may be controlled or managed by the one or more services 120(1)-(M) with which the control plane 118 and/or other services and systems may interact. The services 120(1)-(M) may perform various functions and operating involving computing resources, such as data processing, data storage, data modification, data retrieval, network communications, etc. The services 120(1)-(M) may be accessible via API calls and/or other types of service requests.

The services 120(1)-(M) may be individually configured with access policies 121(1)-(M) that may include permissions as described herein that may be associated with particular users, systems, services, etc. Alternatively, or in addition, the access policies 121(1)-(M) may be applicable to the associated computing resource (e.g., instead of to a particular service hosted by the resource). The access policies may include 121(1)-(M) permissions associated with particular users and/or roles for accessing or initiating the services 120(1)-(M). In various embodiments, the access policies 121(1)-(M) may be substantially similar to the access policy 119, while in other embodiments, the access policies 121(1)-(M) may include permission applicable only to its associated computing service and/or resource.

The resources 114(1)-(M) and/or the services 120(1)-(M) may be individually configured with APAS clients 122(1)-(M). The APAS clients 122(1)-(M) may record actions attempted (e.g., whether successful or not) at the associated service and/or computing resource. The APAS clients 122(1)-(M) may transmit indications of these action attempts to the APAS 104 for use in generating and modifying access envelopes.

In the example shown in FIG. 1, the principal 112 may operate the device 110 to interact with the control plane 118 and initiate a workflow operation that involves requesting services from the services 120(1)-(M) and/or (e.g., directly or indirectly) from the resources 114(1)-(M). For example, the control plane 118 may request a service from the service 120(1) that manages the computing resource 114(1). The access policy 119 at the control plane 118 may allow this request to be transmitted and the access policy 121(1) at the service 120(1) may permit the requested service to be performed by the service 120(1). The APAS client 122(1) may record the receipt and/or acceptance of the request. Alternatively, or in addition, the APAS client 122(1) may transmit an indication of the receipt and/or acceptance of the request to the APAS 104. This indication may include data associated with the request and/or acceptance. Such data may include the requesting principal, device, workflow, operation, and/or control plane. Such data may also, or instead, indicate the requested service and/or the status of the request (e.g., accepted, denied, successful, unsuccessful, etc.).

The APAS 104 may determine the access envelope associated with the request (e.g., based on principal, service, workflow, etc. that may be indicated in the data provided by the APAS client 122(1)). The APAS 104 may analyze the determined access envelope to determine whether a permission corresponding to the request made to the service 120(1) and/or associated with the computing resource 114(1) by the principal 112 (and/or the device 110 or control plane 118) is included in the envelope. For example, the APAS 104 may determine whether a permission for performing the requested service by the principal 112 at the service 120(1) is already configured in the access envelope. If so, the APAS 104 may take no action, leaving the envelope as currently configured. If there is no permission associated with the particular request for service by the principal 112 at the service 120(1), the APAS 104 may configure a permission in the access envelope permitting such a request, storing the modified access envelope in the access envelopes data store 106.

In a particular example, the service 120(1) may be a resource query service for querying a set of resources to determine resources that are available for performing operations (e.g., in a workflow). The control plane 118 may request the initiation of the resource query service 120(1) and, in response, the service 120(1) may reply with an acknowledgement of the request and/or data responsive to the request. The APAS client 122(1) may record the receipt of the resource query request, the acceptance of the request by the service 120(1), the affirmative response generated by the service 120(1) in response to the request, and/or responsive data generated by the 120(1). The APAS client 122(1) may transmit at least some of this data to the APAS 104. Alternatively, or in addition, the APAS 104 may detect the resource query request, related data, and/or responsive data at the control plane 118. Based on the data associated with the resource query request, the APAS 104 may determine whether to generate an access rule or permission for the access envelope associated with the principal 112 that permits a user to perform the resource query request. If the APAS 104 determines to generate such a rule or permission, it may do so and add that rule or permission to the access envelope.

In various embodiments, the APAS 104 may generate a rule or permission to be added to an access envelope based on a denial of a request for resources that would have been permitted if such a rule were applied. Alternatively, or in addition, the APAS 104 may generate a rule or permission to be added to an access envelope based on a detected request for resources, regardless of whether the request was accepted or denied. In such embodiments, the APAS 104 may determine whether the rule is a duplicate of, or redundant to, an existing rule in the access envelope before adding the rule to the access envelope to reduce rule and permission duplication. In this way, the APAS 104 may generate an access envelope reflecting a complete set of permissions required for a user to execute a particular workflow.

In various embodiments, the APAS 104 may store a record of the indicated request for future use. For example, the APAS 104 may record that the request was made for service by the principal 112 at the service 120(1) and/or may maintain a count of such requests. Alternatively, or in addition, the APAS 104 may track the frequency of particular request types. For example, the APAS 104 may track how often a particular request type has been made over a particular time period. This and other request data may be used in the disclosed techniques for generating and modifying access envelopes as described herein.

To continue the example shown in FIG. 1, the workflow operation initiated by the principal 112 may further cause a request for a service from the service 120(2) managing the computing resource 114(2). The access policy 119 at the control plane 118 may allow this request to be transmitted, however, the access policy 121(2) at the service 120(2) may not permit the requested service to be performed by the service 120(2). Therefore, the service 120(2) may send a denial of the request to the control plane 118 and/or otherwise not perform the requested service.

The APAS client 122(2) may record the receipt and/or denial of the request. Alternatively, or in addition, the APAS client 122(2) may transmit an indication of the receipt and/or denial of the request to the APAS 104. This indication may include data associated with the request and/or denial and any associated data.

The APAS 104 may determine the access envelope associated with the request (e.g., as described herein) and analyze the determined access envelope to determine whether a permission corresponding to the request made to the service 120(2) by the principal 112 (and/or the device 110 or control plane 118) is included in the envelope. Because the request was denied, such a permission may not be configured on the access envelope. If there is no permission associated with the particular request for service by the principal 112 at the service 120(2), the APAS 104 may configure a permission in the access envelope permitting such a request, storing the modified access envelope in the access envelopes data store 106. In this way, the APAS may update the access envelope for the principal 112 performing the particular workflow operation so that appropriate access is granted in the future. As noted above, the APAS 104 may store a record of the indicated request and associated data for future use.

In a particular example, the service 120(2) may be a virtual machine service that instantiates one or more virtual machines for performing operations (e.g., data processing operations in a workflow). The control plane 118 may have determined to request the virtual machine service 120(2) based on responsive data received from a previous service request (e.g., a resource query service 120(1) in the example above). The control plane 118 may request the initiation of the virtual machine service 120(2) and, in response, the virtual machine service 120(2) may reply with a denial of the request and/or data indicating such a denial. The APAS client 122(2) may record the receipt of the virtual machine request, the denial of the request by the service 120(2), the denial response generated by the virtual machine service 120(2) in response to the request, and/or responsive data generated by the 120(2) (e.g., reasons for the denial, denial code, etc.). The APAS client 122(2) may transmit at least some of this data to the APAS 104. Alternatively, or in addition, the APAS 104 may detect the virtual machine request, related data, and/or responsive data at the control plane 118. Based on the data associated with the resource query request, the APAS 104 may determine whether to generate an access rule or permission for the access envelope associated with the principal 112 that permits a user to perform the virtual machine request. If the APAS 104 determines to generate such a rule or permission, it may do so and add that rule or permission to the access envelope.

Requests for services may be performed hierarchically. Referring again to FIG. 1, the workflow operation initiated by the principal 112 may further cause a request for a service from the service 120(3) associated with the computing resource 114(3). The access policy 119 at the control plane 118 may allow this request to be transmitted and the access policy 121(3) at the service 120(3) may also permit the requested service to be performed by the service 120(3). As part of performing the requested service, the service 120(3) may send request for service to the service 120(M) managing the computing resource 114(M). This request may indicate that the request is being made on behalf of the control plane 118 (or an associated entity, such as the principal 112). The access policy 121(M) at the service 120(M) may permit the requested service to be performed by the service 120(M).

The APAS clients 122(3) and 122(M) may individually record the receipt and/or acceptance (or denial) of these requests. Alternatively, or in addition, the APAS clients 122(3) and 122(M) may individually transmit an indication of the receipt and/or acceptance/denial of these requests to the APAS 104. This indication may include data associated with the requests, acceptance/denial of these requests, and any associated data.

Here again, the APAS 104 may determine the access envelope associated with the requests (e.g., as described herein) and analyze the determined access envelope to determine whether a permission corresponding to the request made to the service 120(3) by the principal 112 (and/or the device 110 or control plane 118) is included in the envelope and/or whether a permission corresponding to the request made by the service 120(3) to the service 120(M) is included in the envelope. If there is no permission associated with one or both such requests, the APAS 104 may configure one or more permissions in the access envelope permitting such requests, storing the modified access envelope in the access envelopes data store 106. As noted, the APAS 104 may also store a record of the indicated requests and associated data for future use.

In a particular example, the service 120(3) may be a data processing service that processes data stored at another computing resource to perform one or more operations (e.g., data processing operations in a workflow). The control plane 118 may have determined to request the data processing service 120(3) based on responsive data received from a previous service request (e.g., a resource query service 120(1) in the example above). The control plane 118 may request the initiation of the data processing service 120(3) and, in response, the data processing service 120(3) may reply with an acceptance of the request and/or data indicating such an acceptance. The APAS client 122(3) may record the receipt of the data processing request, the acceptance of the request by the service 120(3), the acceptance response generated by the virtual machine service 120(3) in response to the request, and/or responsive data generated by the data processing service 120(3) (e.g., the data resulting from the data processing operations). The APAS client 122(3) may transmit at least some of this data to the APAS 104. Alternatively, or in addition, the APAS 104 may detect the virtual machine request, related data, and/or responsive data at the control plane 118. Based on the data associated with the resource query request, the APAS 104 may determine whether to generate an access rule or permission for the access envelope associated with the principal 112 that permits a user to perform the data processing request. If the APAS 104 determines to generate such a rule or permission, it may do so and add that rule or permission to the access envelope.

The data processing service 120(3) may, in fulfilling the data processing service requested by the control plane 118, request access to a dataset stored at a storage service. For example, the service 120(M) may be a dataset access service providing access to a particular dataset associated with the data processing request transmitted to the data processing service 120(3) by the control plane 118. The data processing service 120(3) may transmit a data access request to the dataset access service 120(M) that may reply with an acceptance of the request, data indicating such an acceptance, and/or the dataset (or some portion thereof responsive to the request). The APAS client 122(M) and/or the APAS client 122(3) may record any one or more of the transmittal of the dataset access request, receipt of the dataset access request, the acceptance of the dataset access request by the service 120(M), the acceptance response generated by the dataset access service 120(M) in response to the request, responsive data generated by the dataset access service 120(M) (e.g., the data request in the dataset access request), and/or responsive data received by the data processing service 120(3) (e.g., the data received in response to the dataset access request). The APAS client 122(M) and/or the APAS client 122(3) may transmit at least some of this data to the APAS 104.

In some embodiments, this example dataset access request may not be detectable by the control plane 118 because it originated at the service 120(3) and was received at the server 120(M) without direct involvement of the control plane 118. In such embodiments, the APAS 104 may not be able to detect this request via the control plane 118 and may rely on APAS client data to detect such requests. Alternatively, or in addition, the APAS 104 may deductively detect such a request (e.g., based on a request originating at the control plane 118 that initiated one or more subsequent, hierarchical requests) or, in some configuration, all requests may be reported to and/or otherwise detected at the control plane 118. In such embodiments, the APAS 104 may detect the request, related data, and/or responsive data via the control plane 118. Based on the data associated with the dataset access request, the APAS 104 may determine whether to generate an access rule or permission for the access envelope associated with the principal 112 that permits a user to perform the dataset access request. If the APAS 104 determines to generate such a rule or permission, it may do so and add that rule or permission to the access envelope.

The APAS 104 may track the usage of permissions in an envelope over time and/or workflow operations to determine whether to maintain such permissions. As described above, when a permission is not configured in an access envelope but is required for a principal to perform one or more operations, the APAS may add it to the envelope to "grow" the envelope as described herein. But it may introduce security risks to leave permissions in an envelope if they are not needed for legitimate functions. Therefore, the APAS may "prune" or otherwise remove unneeded and/or unnecessary permissions from an access envelope as described herein.

For example, the APAS 104 track the performance of actions in workflows and/or during operations. The APAS 104 may determine that a particular action for which a permission has been configured in an access envelope has not been attempted in several iterations (e.g., a threshold number of times) of the operation or workflow (e.g., performed by a particular principal) associated with the envelope. Based on this determination, the APAS 104 may determine that the permission for that action is no longer needed and may remove that permission from the envelope.

A determination by the APAS 104 to remove a permission may be based on a variety of criteria. In various embodiments, if a workflow completes once without utilizing a particular permission, the APAS 104 may remove that permission from the associated access envelope. Alternatively, or in addition, if a workflow completes a threshold number of times without utilizing a particular permission, the APAS 104 may remove that permission from the associated access envelope. Alternatively, or in addition, if a workflow does not make use of a particular permission for a threshold amount of time (e.g., 30 days, six months, a year), the APAS 104 may remove that permission from the associated access envelope. Alternatively, or in addition, the APAS 104 may receive an indication that the workflow no longer makes use of a particular permission and may, in response, remove that permission from the associated access envelope. Other criteria are also contemplated for determining to remove a permission from an access envelope.

The APAS 104 may "finalize" or otherwise determine a complete form of an access envelope at a particular point in time and/or in response to one or more conditions. For example, the APAS 104 may determine that a workflow associated with a particular access envelope has been completed (once or after a number of iterations). In response, the APAS 104 may finalize the access envelope by removing one or more initial permissions or rules permitting broad general access and leave the permission generated during the workflow execution in the access envelope. Alternatively, or in addition, the APAS 104 may remove one or more rules or permission that were not applied during the workflow operation (e.g., based on tracking the detected requests and/or rule applications as described herein). This may result in an access envelope that represents the permissions and rules required for a user to perform a particular workflow, but excludes (e.g., any) rules and permissions that are not needed to perform the workflow, thereby providing the needed access to such users without unnecessarily compromising security by allowing access to services and/or resources that are not involved in the workflow.

The APAS 104 may determine one or more access envelopes as proposed role definitions. For example, the APAS 104 may receive a request for proposed permissions for a role associated with the principal 112. The APAS 104 may determine an access envelope from the access envelope data store 106 that is associated with the principal 112 and responsively provide the determined access envelope and/or the permissions represented therein. The permissions represented in the determined access envelope may then be used to generate a role that may be assigned to one or more users that may perform similar functions to the principal used to generate the access envelope.

In another example, the APAS 104 may receive a request for proposed permissions for a role associated with a particular workflow or operation. The APAS 104 may determine an access envelope from the access envelope data store 106 that is associated with the particular workflow or operation and responsively provide the determined access envelope and/or the permissions represented therein. The permissions represented in the determined access envelope may then be used to generate a role that may be assigned to one or more users that may perform the workflow or operation (or a similar workflow or operation) used to generate the access envelope.

In another example, the APAS 104 may generate access envelopes with one or more associated roles. The APAS 104 may receive a request for proposed permissions for a particular role and may determine an access envelope from the access envelope data store 106 that is associated with the particular role. The APAS 104 may responsively provide the determined access envelope and/or the permissions represented therein. The permissions represented in the determined access envelope may then be used in that role when it is assigned to one or more users.

In various embodiments, a process for determining permissions and rules for particular roles may be performed periodically and/or repeatedly to ensure that access permissions for particular roles are up to date. For example, the APAS 104 may be configured to periodically generate an access envelope as described herein for a particular (e.g., top-level) principal and a particular workflow. For instance, the APAS 104 may notify the principal 112 and/or an administrator that the workflow is to be executed and/or may execute the workflow automatically. The access role associated with that workflow may then be updated after the periodic access envelope update.

Alternatively, or in addition, an access envelope may be generated as described herein for a particular (e.g., top-level) principal and a particular workflow in response to a condition or detected activity. For example, the APAS 104 may receive a notification of, or detect, a change in an environment configured with computing services and/or resources, such as the environment 100. In response, the APAS 104 may generate an access envelope as described herein for a particular (e.g., top-level) principal or (e.g., hierarchical) role and a particular workflow. For instance, the APAS 104 may notify the principal 112 and/or an administrator that the workflow is to be executed and/or may execute the workflow automatically. The access role associated with that workflow may then be updated after the access envelope update.

In a particular example, the principal 112 may be operating the device 110 to operate the control plane 118 that may be an ML system service control plane. Initially, the access policy 119 may be configured with permissive permission allowing the principal 112 (and/or the device 110 and/or the control plane 118) to perform a broad range of operations. The principal 112 may initiate an ML workflow that involves a cluster of ML operations that may utilize a variety of computing resources and services.

The cluster of operations initiated by the principal 112 may include initiating a first operation that in turn initiates a cascade of operations involving various interoperating services and/or resources to complete the workflow. For instance, the principal may initiate an ML workflow operation that will determine the data processing requirements to execute other operations within the workflow. This initial operation may then instantiate virtual machine instances at computing resources 114(1)-(3) using services 120(1)-(3), respectively. The virtual machine instantiated at the service 120(3) may initiate one or more service requests to the service 120(M), which may be a storage service. For example, the service 120(3) may perform operations on data stored at the computing resource 119(M) and accessible via the service 120(M).

In this example, the APAS 104 may monitor the requests from the control plane 118 to the various computing resources 114(1)-(M) and services 120(1)-(M) during the ML workflow. The APAS 104 may also, or instead, receive data from one or more of the APAS clients 122(1)-(M). For example, the APAS 104 may detect the calls to instantiate the virtual machines executing as services 120(1)-(3) based on monitoring the control plane 118 and may receive an indication that the virtual machine executing as service 120(3) has accessed the storage service provided by the service 120(M) from the APAS client 122(M).

In response to these access detections, the APAS 104 may generate permissions that may be added to an access envelope for the principal 112 and stored at the access envelopes 106. In various embodiments, the APAS 104 may generate permissions for the individual requested operations. For example, the APAS 104 may generate permissions allowing the principal 112 to instantiate virtual machines using services 120(1)-(3) and a permission allowing a virtual machine instantiated by the service 120(3) to request storage service from the service 120(M).

Alternatively, the APAS 104 may generate permissions for denied operations so that such operations will be permitted in the future for roles that are based on the access envelope generated for the principal 112. For example, if the control plane 180, as part of the instant example ML workflow, requests the instantiation of a virtual machine from the service 120(2) and the service 120(2) denies the request, the APAS 104 may add a permission or access rule to the access envelope associated with the principal 112 explicitly allowing the principal 112 to instantiate a virtual machine via the service 120(2).

Once this example ML workflow is completed, the access envelope generated for this particular ML workflow and associated with the principal 112 may be stored in the access envelope store 106. This access envelope may then be used to generate permissions and/or access rules for roles that may be assigned to other users that will be performing similar functions. For example, upon completion of this example ML workflow by the principal 112 (e.g., after one or several iterations), the access envelope may contain the permissions required to perform the operations of the ML workflow without extraneous permissions for activities or operations unrelated to the ML workflow. The APAS 104 may receive a request for recommended permissions for an access role associated with the principal 112 and/or for the particular example ML workflow. The APAS 104 may respond with the access envelope generated during the execution(s) of the ML workflow as the recommended permissions for this access role.

Figure 2:
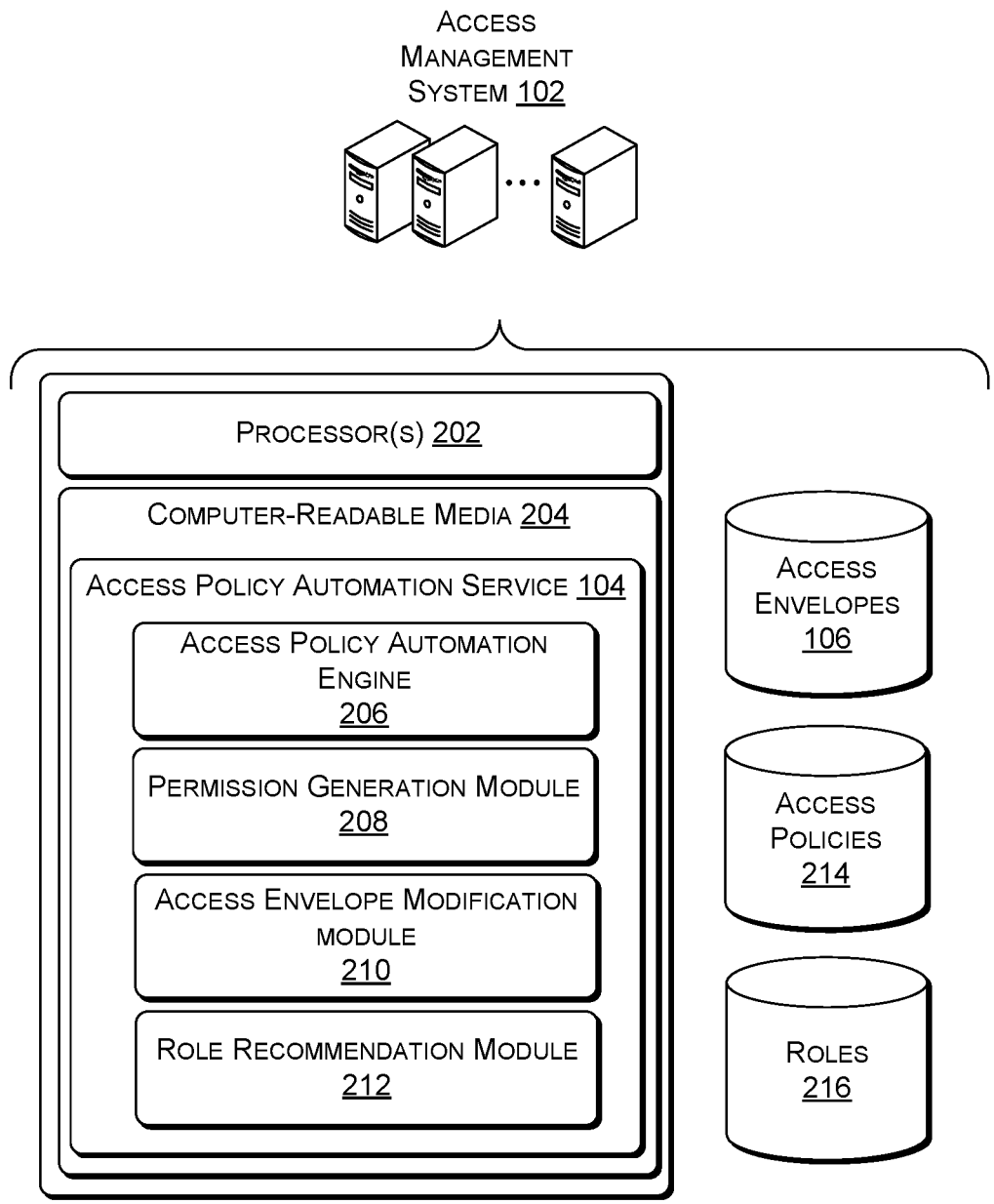
FIG. 2 is a block diagram of an illustrative computing architecture of the access management system shown in FIG. 1.

FIG. 2 is a block diagram of an illustrative computing architecture of the AMS 102 shown in FIG. 1. The computing architecture 200 may be implemented in a distributed or non-distributed computing environment.

The computing architecture 200 may include one or more processors 202 and one or more computer readable media 204 that stores various modules, applications, programs, and/or other data. The computer-readable media 204 may include instructions that, when executed by the one or more processors 202, cause the processors to perform the operations described herein for the APAS 104.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMS, EEPROMs, flash memory, magnetic or optical cards, solid-state memory devices, and/or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store portions, or components, of the APAS 104 as described herein. The APAS 104 may include an access policy automation engine 206, a permission generation module 208, an access envelope modification module 210, and/or a role recommendation module 212, which are described in turn. The modules may be stored together or in a distributed arrangement. The computing architecture may include or have access to the access envelopes data store 106, access policies data store 214, and/or roles data store 216.

The AMS 102 may provide and/or configure access policies at various services and resources described herein. Such access policies may be stored at the access policies data store 214. The AMS may also, or instead, provide and/or configure roles for various users at various services and resources described herein. Such roles may be stored at the roles data store 216.

The access policy automation engine 206 may enable the observation and tracking of actions performed in an environment (e.g., by a particular principal, workflow, operation, etc.). For example, the access policy automation engine 206 may detect requests for service on a control plane (e.g., control plane 118) and/or by interacting with one or more APAS clients (e.g., APAS clients 122(1)-(M)). The access policy automation engine 206 may evaluate access envelopes stored in the access envelope store 106 to determine whether a permission is to be generated based on an action as described herein. If so, the access policy automation engine 206 may extract, generate, or otherwise provide action data to the permission generation module 208.

The access policy automation engine 206 may also, or instead, evaluate access envelopes stored in the access envelope store 106 to determine whether permissions should be removed from such envelopes, for example, based on permission usage and/or service/resource access as described herein. If so, the access policy automation engine 206 may provide permission data to the access envelope modification module 210 to allow the module 210 to update envelopes by removing permissions.

The permission generation module 208 may determine and/or generate, based on the action data received from the access policy automation engine 206, a permission that allows the associated action. This determination and/or generation may include classifying the action to determine an appropriate permission or permission template and/or generating the permission based on an action classification.

The access envelope modification module 210 may enable the generation and modification of an access envelope. For example, the access envelope modification module 210 may receive a permission to be added to a particular access envelope from the permission generation module 208. The access envelope modification module 210 may retrieve the envelope from the access envelope store 106 and modify the envelope to add the permission. The access envelope modification module 210 may the store the updated envelope in the access envelope store 106. The access envelope modification module 210 may also, or instead, receive permission pruning data (e.g., from the access policy automation engine 206) and may responsively retrieve the appropriate envelope from the access envelope store 106 and modify the envelope to remove the specified permission, storing the updated envelope in the access envelope store 106.

The role recommendation module 212 may generate recommended permissions for roles. For example, the role recommendation module 212 may receive or detect a request for recommended permissions for a role that will include performance of a particular operation or workflow and/or associated with a particular principal. The role recommendation module 212 may determine one or more access envelopes from the access envelope store 106 (e.g., as described herein) and may responsively provide the associated permissions as recommended permissions for the role. Alternatively, or in addition, access envelopes may be associated with roles in the roles store 216 and the role recommendation module 212 may retrieve envelopes and/or permissions from the access envelopes store 106 based on an indicated role.

Figure 3:
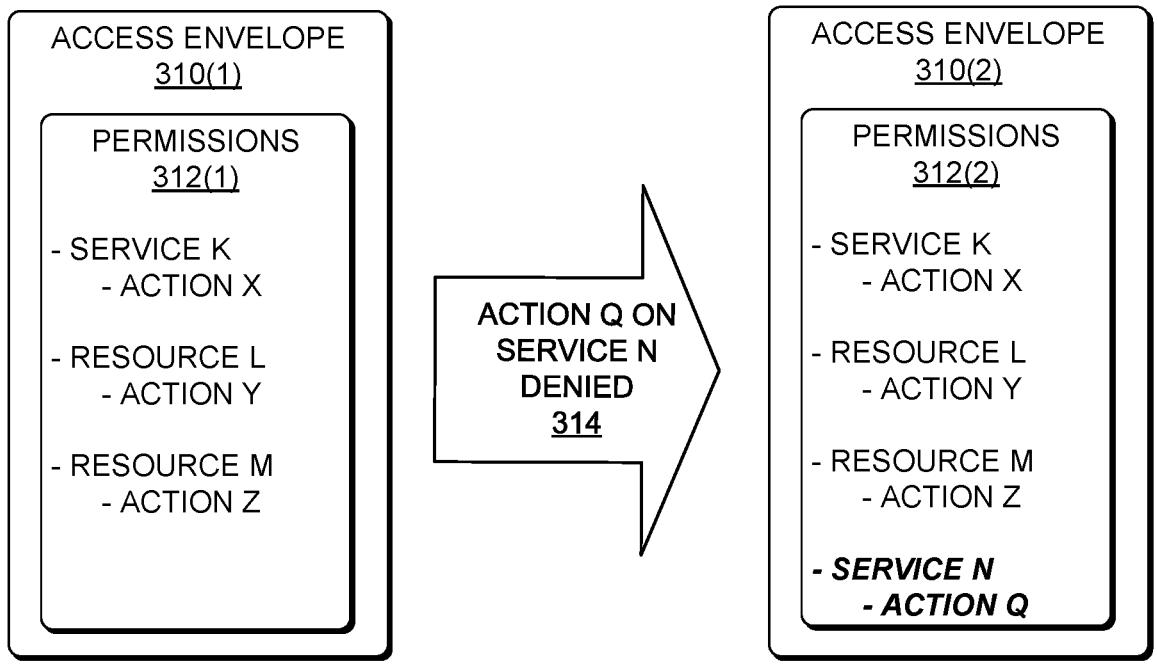
FIG. 3 illustrates a block diagram of an access envelope data structure as it is modified by an APAS.

FIG. 3 illustrates a block diagram representing an access envelope data structure 310 as it "grows" or is otherwise modified to add permissions. The envelope 310 may be associated with a particular role and/or operations performed by a user operating at a particular level in a system hierarchy. In examples, the envelope 310 may be associated with a particular principal that may be operating in a particular role and performing operations on particular resources and/or services at a particular level in a system hierarchy.

The envelope 310(1) includes permissions 312(1) in a first state (e.g., at a first point in time, at a first point in a workflow, etc.). While the associated workflow or operation is being performed, an action "Q" requested on a service "N" was denied to the principal associated with the access envelope 310 at 314. Based on this denial, an APAS may modify the access envelope 310 to include a permission allowing this action. The result may be the envelope 310(2) that includes permissions 312(2) in a second state (e.g., at a second, later point in time, at a second, later point in a workflow, etc.). The updated permissions 312(2) may include a permission allowing the action "Q" that was requested on the service "N" and denied, thereby allowing that action to be performed by the principal, workflow, and/or operation associated with the access envelope 310 in the future.

For example, to continue again with the particular example described above in regard to FIG. 1, the APAS 104 may generate the access envelope 310(1) for the principal 112 executing a particular ML workflow. The APAS 104 may detect the that the control plane 118, as part of the instant example ML workflow, requested the instantiation of a virtual machine from the computing resource 114(2) and the computing resource 114(2) denied the request (e.g., represented as "Service N-Action Q" in FIG. 3). In response, the APAS 104 may add a permission or access rule (e.g., "Service N-Action Q" in FIG. 3) to the access envelope 310 to generate the updated access envelope 310(2) that will allow a user to instantiate a virtual machine on the computing resource 114(2) if the access envelope 310 serves as the basis for the applicable access policy or access role.

Figure 4:
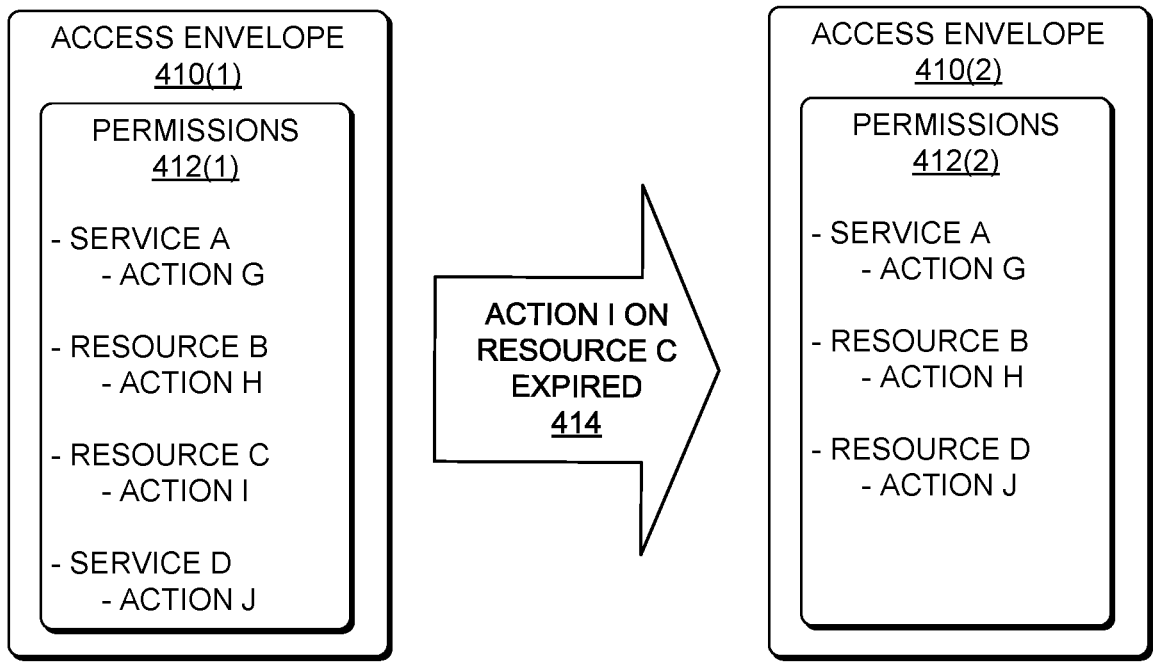
FIG. 4 illustrates a block diagram of another access envelope data structure as it is modified by an APAS.

FIG. 4 illustrates a block diagram representing an access envelope data structure 410 as it is "pruned" or is otherwise modified to remove permissions. The envelope 410 may be associated with a particular role and/or operations performed by a user operating at a particular level in a system hierarchy. In examples, the envelope 410 may be associated with a particular principal that may be operating in a particular role and performing operations on particular resources and/or services at a particular level in a system hierarchy.

The envelope 410(1) includes permissions 412(1) in a first state (e.g., at a first point in time, at a first point in a workflow, etc.). An APAS may determine at 414 that one or more criteria for lack of use of an action "I" performed on a resource "C" (or lack of use of an associated permission) have been met. As described above, such criteria may include a lack of use of a permission or action for a threshold period time, a threshold number of workflow executions, etc. Based on determining that this permission and/or its associated action are unused, an APAS may modify the access envelope 410 to remove the permission allowing this action. The result may be the envelope 410(2) that includes permissions 412(2) in a second state (e.g., at a second, later point in time, at a second, later point in a workflow, etc.). The updated permissions 412(2) may no longer include a permission allowing the action "I" performed on the resource "C", thereby blocking that action from being performed by the principal, workflow, and/or operation associated with the access envelope 410 in the future.

For example, to continue again with the particular example described above in regard to FIG. 1, the APAS 104 may generate the access envelope 410(1) for the principal 112 executing a particular ML workflow. The APAS 104 may determine that the control plane 118, as part of the instant example ML workflow, has not requested the instantiation of a virtual machine from the computing resource 114(M) (e.g., within a past threshold amount of time, within a threshold number of workflow executions, etc.). This request may be permitted in the access envelope 410(1) (e.g., represented as "Resource C-Action I" in FIG. 4). In response to determining that this permission has is unused, the APAS 104 may remove this permission from the access envelope 410 to generate the updated access envelope 410(2) that does not include this permission. Because this rule has been removed from the access envelope 410, a user using an access role based on the access envelope 410 will not be permitted to instantiate a virtual machine on the computing resource 114(M).

Figure 5:
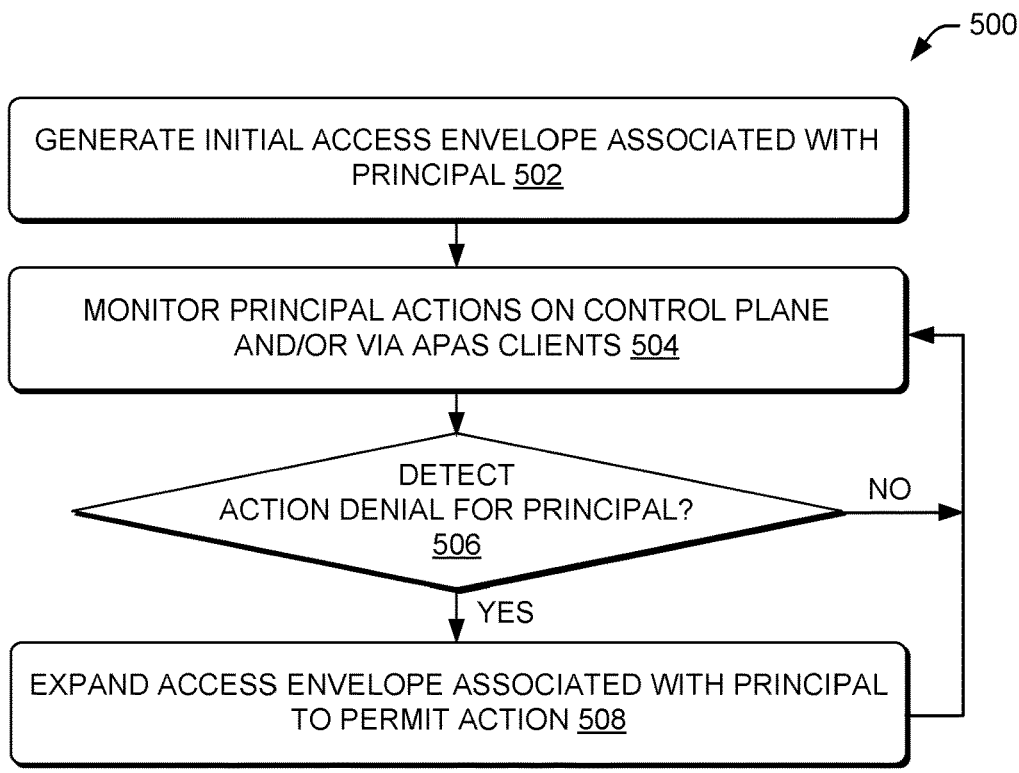
FIG. 5 illustrates a flow diagram of an example method for an APAS to modify an access envelope in response to detecting an action.
Figure 6:
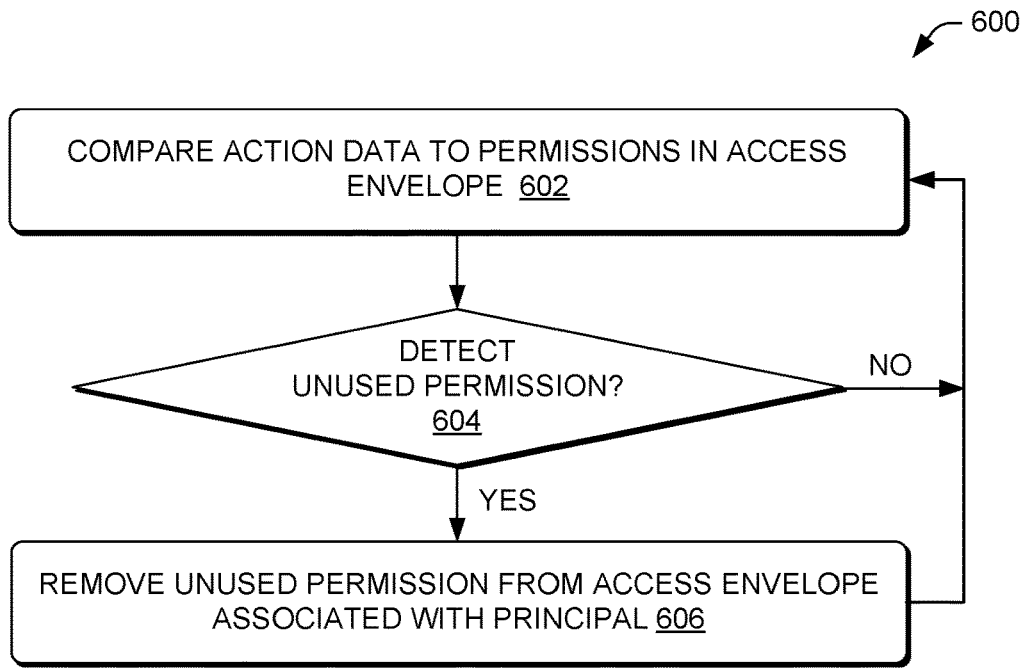
FIG. 6 illustrates a flow diagram of an example method for an APAS to modify an access envelope in response to detecting an unused action.
Figure 7:
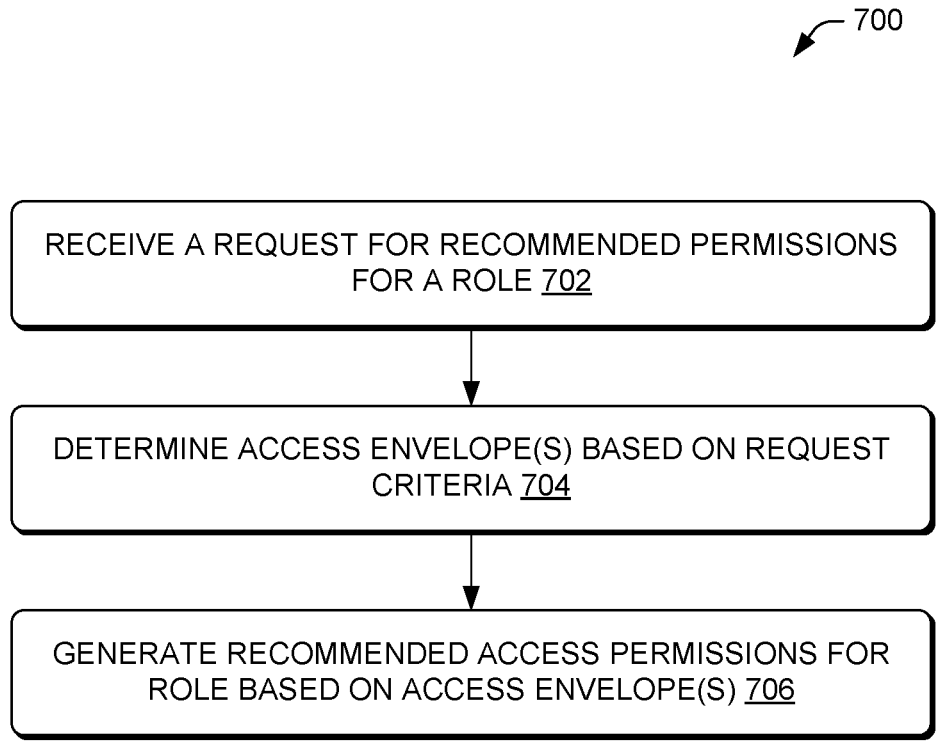
FIG. 7 illustrates a flow diagram of an example method for an APAS to generate recommended access role permissions based on access envelopes.

FIGS. 5-7 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 5 is a flow diagram of an illustrative process 500 to generate and modify access envelopes. The process 500 is described with reference to the environment 100 and the computing architecture 200 and may be performed by the APAS 104. Of course, the process 500 may be performed in other similar and/or different environments.

At 502, the APAS 104 may generate an initial access envelope associated with a principal. The APAS 104 may generate this initial envelope based on an instruction received from an operator or administrator of a complex, data-intensive system (e.g., an ML system). The initially generated access envelope may be associated with a particular principal, workflow, and/or workflow operation. In some embodiments, the initially generated envelope may also be associated with one or more roles. The initially generated access envelope may contain a default or initial set of permissions. This initial set of permissions may be substantially permissive, substantially restrictive, or at moderately permissive. In some examples, the APAS may generate an initial set of permissions for an access envelope based on expected accesses by the principal, workflow, or operation associated with the access envelope.

At 504, the APAS 104 may monitor actions (e.g., by and/or on behalf of a principal) in an environment. This monitoring may be performed by receiving or obtaining data from a control plane (e.g., control plane 118) with which the principal is interaction and/or by receiving or obtaining data from one or more APAS clients that may be configured on one or more computing resources and/or services as described herein. Such data may include indications of an associated principal, workflow, operation, action (e.g., API call, resource request, service request, etc.), action result (e.g., denied, accepted, failed, successful, etc.), computing resource involved, service involved, etc.

At 506, the APAS 104 may determine whether the action detected is associated with a denial of service or access for the principal associated with the access envelope. If not (e.g., the action was successful or allowed), the APAS 104 returns to 504 to continue monitoring the actions associated with the principal.

If, at 506, the APAS 104 determines that the action detected is associated with a denial of service or access for the principal associated with the access envelope, at 508 the APAS may "expand" the access envelope associated with the principal. For example, the APAS 104 may generate a permission allowing the denied access or service for the associated principal and may modify the access envelope to include the generated permission.

FIG. 6 is a flow diagram of an illustrative process 600 to modify access envelopes. The process 600 is described with reference to the environment 100 and the computing architecture 200 and may be performed by the APAS 104. Of course, the process 600 may be performed in other similar and/or different environments.

At 602, the APAS 104 may evaluate an access envelope associated with a principal by comparing action data associated with the principal and/or the envelope to permissions in the envelope. For example, the APAS 104 may track the actions made by a principal associated with the access envelope. The APAS 104 may then compare the actions associated with permissions in the envelope to actions taken by the principal.

At 604, the APAS may determine if there are permissions that are sufficiently underutilized (e.g., unused) in the access envelope. If so, at 606 the APAS may remove those permissions from the envelope at 604.

For example, a determination by the APAS 104 at 604 as to whether a permission is unused may be based on a variety of criteria. If the APAS 104 determined that a workflow associated with the envelope and/or principal has been completed (e.g., once or at least a threshold number of times) without utilizing a particular permission, the APAS 104 may remove that permission from the access envelope at 606. Alternatively, or in addition, if the APAS 104 determines that a workflow associated with the envelope and/or principal has not made use of a particular permission for a threshold amount of time (e.g., 30 days, six months, a year), the APAS 104 may remove that permission from the access envelope at 606. Alternatively, or in addition, the APAS 104 may receive an indication at 602 that the workflow no longer makes use of a particular permission and may, in response, may determine at 604 to remove that permission from the access envelope at 606. Other criteria are also contemplated for determining to remove a permission from an access envelope.

FIG. 7 is a flow diagram of an illustrative process 700 to generate recommended permissions for a role using access envelopes. The process 700 is described with reference to the environment 100 and the computing architecture 200 and may be performed by the APAS 104. Of course, the process 700 may be performed in other similar and/or different environments.

At 702, the APAS 104 may receive a request for recommended permissions for a particular role. This request may include any type of data that may be associated with a role and/or an access envelope. For example, the APAS 104 may receive a request for permissions for a role that will participate in a particular workflow or operation. Alternatively, the APAS 104 may receive a request for permissions for a role that will include functions similar to those performed by a particular principal. Any number of various other criteria may be provided with a request received at 702.

At 704, the APAS may determine one or more access envelopes that match the criteria provided in the request received at 702. For example, the APAS 104 may identify an access envelope associated with a workflow or operation indicated in the request received at 702. Alternatively, the APAS may identify an access envelope associated with a principal indicated in the request received at 702. Any number of various other criteria may be used to determine one or more access envelopes.

At 706, the APAS may determine the permissions included in the envelope(s) determined at 704 and provide those permissions as recommended permissions for the role associated with the request received at 702. These permissions may then be used by an operator or administrator as a template for a role that may be assigned to one or more users or systems.

Figure 8:
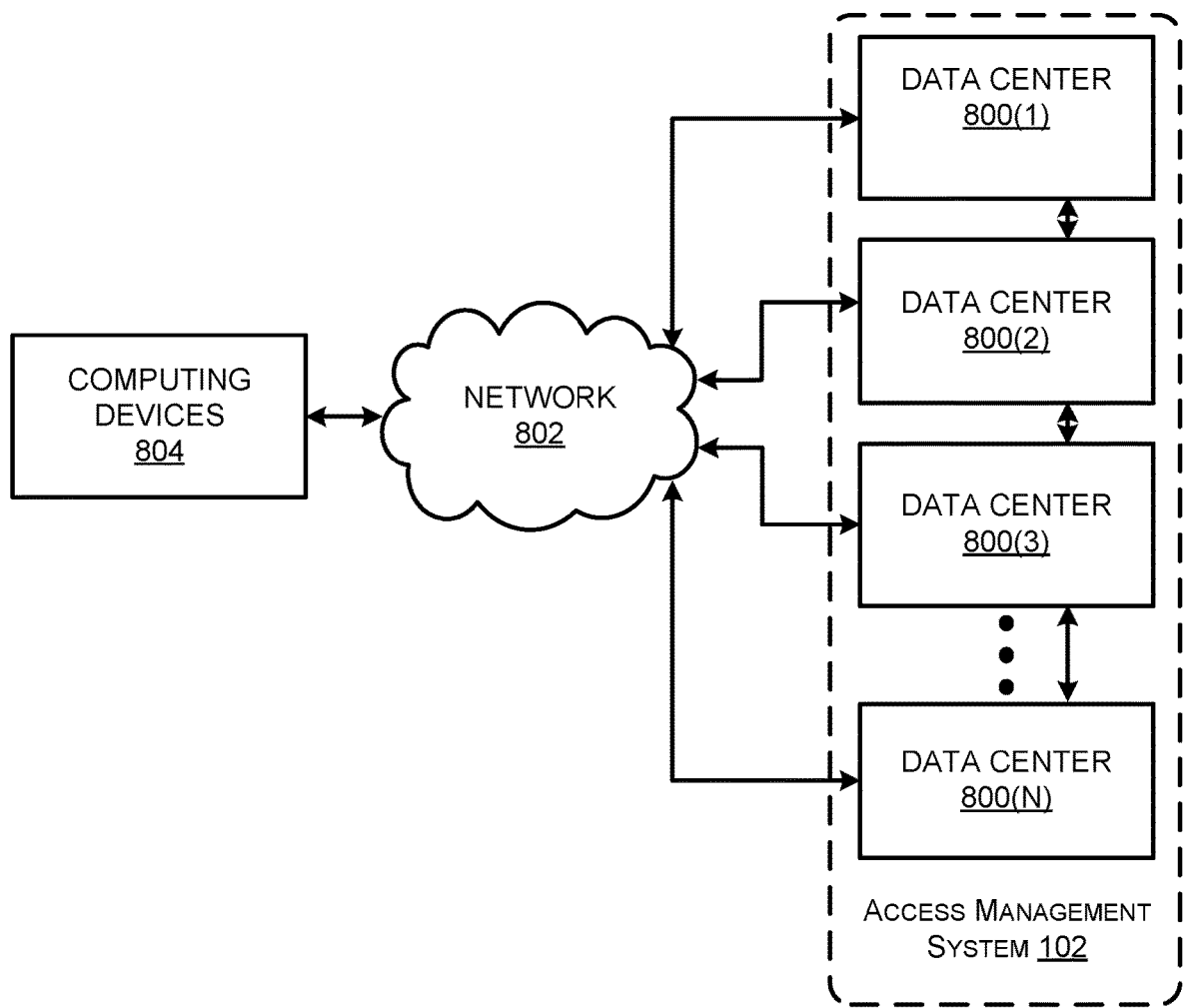
FIG. 8 is a system and network diagram that shows an illustrative operating environment that includes a system that can be configured to implement aspects of the functionality described herein.

FIG. 8 is a system and network diagram that shows an illustrative operating environment that includes an access management system 102 that can be configured to implement aspects of the functionality described herein. As discussed briefly above, the system can execute network services, such as the data storage and data streaming, and/or provide computing services, such as for an ML system or other data-intensive system, on a permanent or an as-needed basis. Among other types of functionality, the computing services provided by the system, or by a larger system of which the system is a part, can be utilized to implement the various access policy and permissions services described herein. As also discussed above, the system may be part of a larger system that provides the additional computing services that include, without limitation, data storage services, data processing services, such as virtual machine (VM) instances, networking services, data communication services, and other types of services and resources.

Each type of computing service and resource provided by the system, or by a larger system of which the system is a part, can be general-purpose or can be available in a number of specific configurations. For example, data processing services and resources can be available as physical computers or VM instances in a number of different configurations. The VM instances can be configured to execute applications, including web servers, application servers, media servers, database servers, some or all of the access policy and permissions services described above, and/or other types of programs. Data storage services and resources can include file storage devices, block storage devices, and the like. The system, or a larger system of which the system is a part, can also be configured to provide other types of computing services and resources not mentioned specifically herein.

The computing services and resources provided by system, or a larger system of which the system is a part, are enabled in one implementation by one or more data centers 800(1), 800(2), 800(3), . . . , 800(N). The data centers are facilities utilized to house and operate computer systems and associated components. The data centers typically include redundant and backup power, communications, cooling, and security systems. The data centers can also be located in geographically disparate locations. One illustrative configuration for a data center that can be utilized to implement the technologies disclosed herein will be described below with regard to FIG. 9.

The users of the system can access the computing services and resources, such as access management system 102, provided by the system over a network 802, which can be a wide area communication network ("WAN"), such as the Internet, an intranet, an Internet service provider ("ISP") network, or a combination of such networks. For example, and without limitation, a computing device 804 (e.g., the computing device 110) operated by a user of the system can be utilized to access the system by way of the network 802. It should be appreciated that a local-area network ("LAN"), the Internet, or any other networking topology known in the art that connects the data centers to remote users and other users can be utilized. It should also be appreciated that combinations of such networks can also be utilized.

Figure 9:
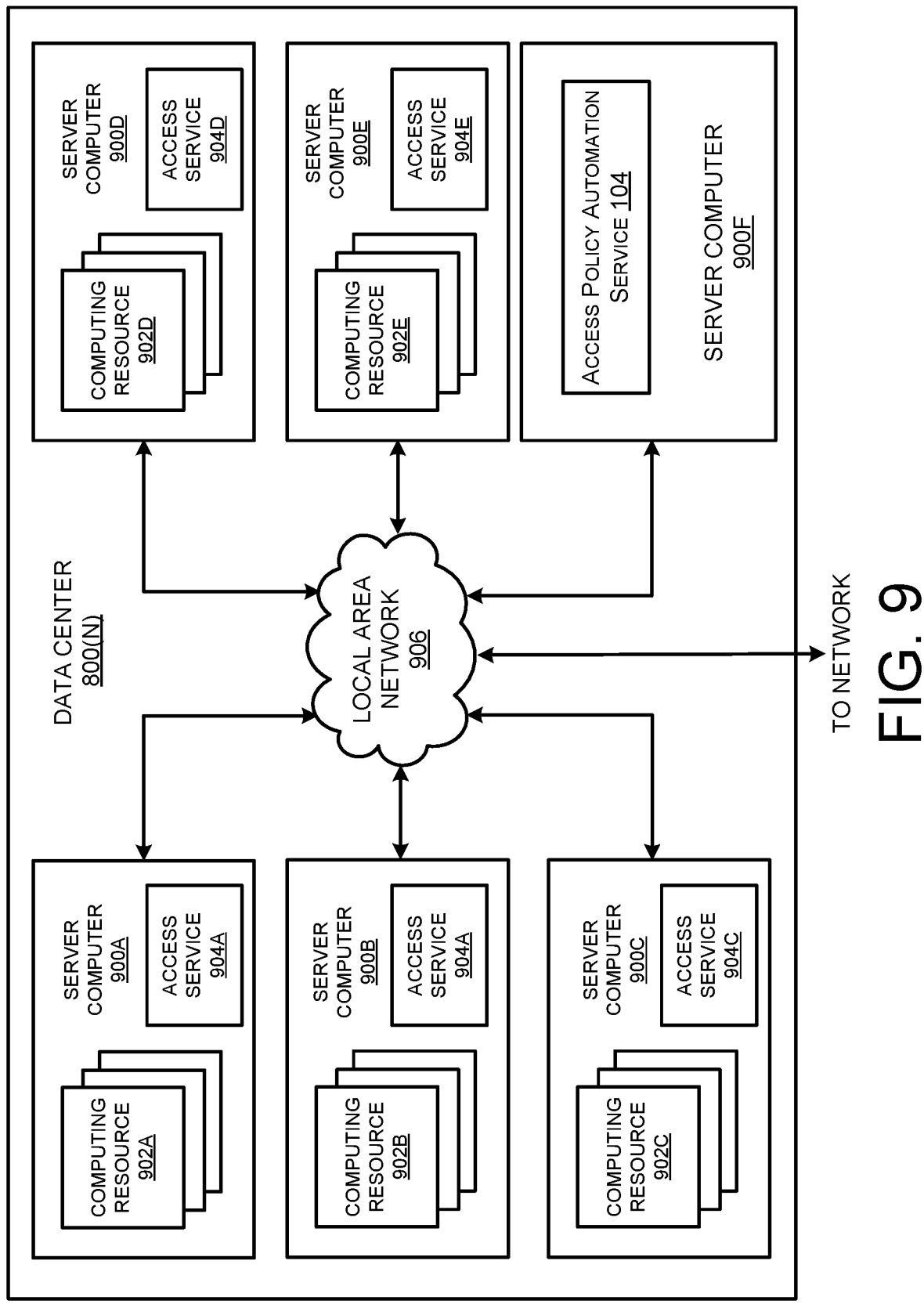
FIG. 9 is a computing system diagram illustrating a configuration for a data center that can be utilized to implement aspects of the technologies disclosed herein.

FIG. 9 is a computing system diagram that illustrates one configuration for a data center 800(N) that can be utilized to implement the access management system 102 as described above in FIGS. 1-7 and/or any other access policy and permissions services disclosed herein, such as those associated with the services 120 and computing resources 114. The example data center 800(N) shown in FIG. 9 includes several server computers 900A-900E (collectively 900) for providing the computing resources 902A-902E (collectively 902), respectively.

The server computers 900 can be standard tower, rackmount, or blade server computers configured appropriately for providing the various computing resources described herein (illustrated in FIG. 9 as the computing resources 902A-902E). As mentioned above, the computing resources 902 provided by the system, or a larger system of which the system is a part, can include, without limitation, analytics applications, data storage resources, data processing resources such as VM instances or hardware computing systems, database resources, networking resources, and others. Some of the servers 900 can also be configured to execute access services 904A-904E (collectively 904) capable of instantiating, providing and/or managing the computing resources 902, some of which are described in detail herein.

The data center 800(N) shown in FIG. 9 also includes a server computer 900F that can execute some or all of the software components described above. For example, and without limitation, the server computer 900F can be configured to execute the access management system 102. The server computer 900F can also be configured to execute other components and/or to store data for providing some or all of the functionality described herein. In this regard, it should be appreciated that components or different instances of the access management system 102 can execute on many other physical or virtual servers in the data centers 800 in various configurations.

In the example data center 800(N) shown in FIG. 9, an appropriate LAN 906 is also utilized to interconnect the server computers 900A-900F. The LAN 906 is also connected to the network 802 illustrated in FIG. 8. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 800(1)-(N), between each of the server computers 900A-900F in each data center 800, and, potentially, between computing resources 902 in each of the data centers 800. It should be appreciated that the configuration of the data center 800 described with reference to FIG. 9 is merely illustrative and that other implementations can be utilized.

Figure 10:
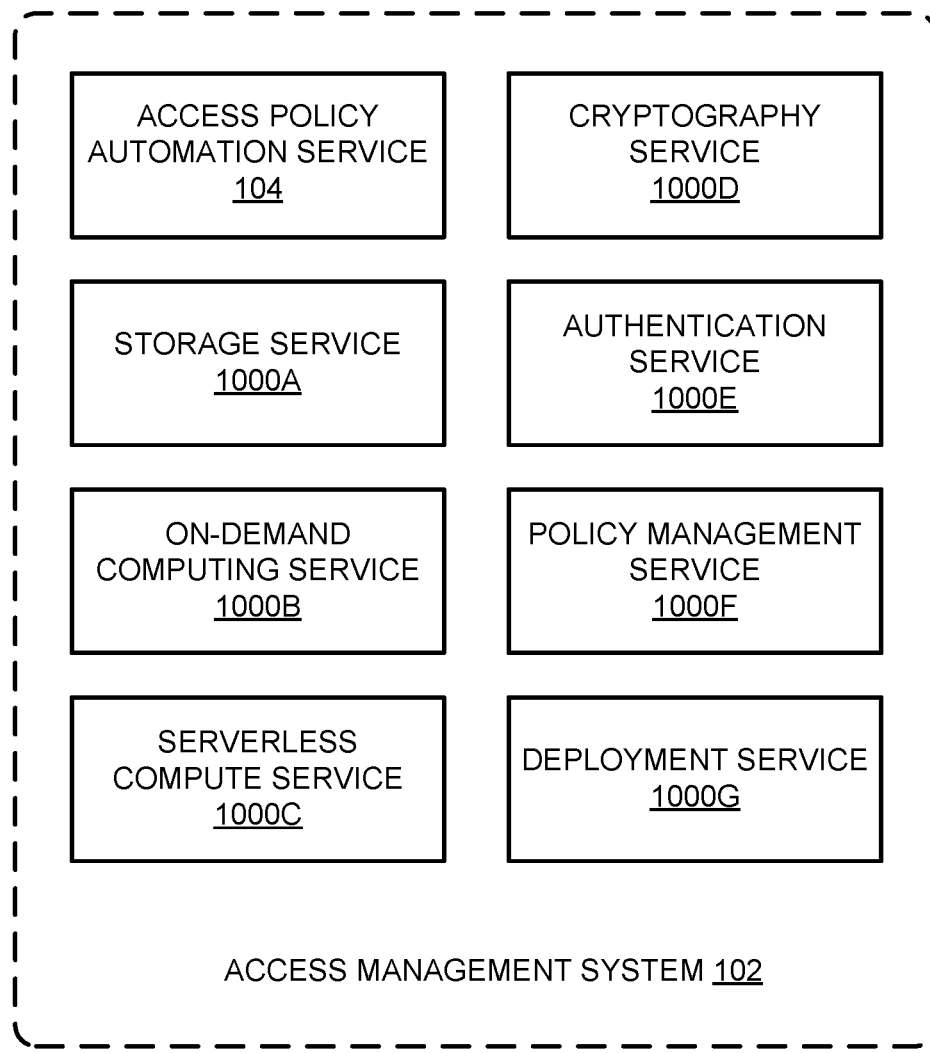
FIG. 10 is a network services diagram that shows aspects of several services that can be provided by and utilized within a system, or a larger system of which the system is a part, which is configured to implement the various technologies disclosed herein.

FIG. 10 is a network services diagram that shows aspects of several services that can be provided by and utilized within the system 102, or a larger system of which the system is a part, which is configured to implement the various technologies disclosed herein. In particular, and as discussed above, the system, or a larger system of which the system is a part, can provide a variety of network services to users and other users including, but not limited to, the APAS 104 and/or a computing instance performing one or more functions thereof, a storage service 1000A, an on-demand computing service 1000B, a serverless compute service 1000C, a cryptography service 1000D, an authentication service 1000E, a policy management service 1000F, and a deployment service 1000G. The system, or a larger system of which the system is a part, can also provide other types of network services, some of which are described below.

It is also noted that not all configurations described include the services shown in FIG. 10 and that additional network services can be provided in addition to, or as an alternative to, the services explicitly described herein. Each of the services shown in FIG. 10 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 10 will now be provided.

The storage service 1000A can be a network-based storage service that stores data obtained from users of the system, or a larger system of which the system is a part. The data stored by the storage service 1000A can be obtained from computing devices of users.

The on-demand computing service 1000B can be a collection of computing services and resources configured to instantiate VM instances and to provide other types of computing services and resources on demand. For example, a user of the system, or a larger system of which the system is a part, can interact with the on-demand computing service 1000B (via appropriately configured and authenticated API calls, for example) to provision and operate VM instances that are instantiated on physical computing devices hosted and operated by the system, or a larger system of which the system is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 1000B is shown in FIG. 10, any other computer system or computer system service can be utilized in the system, or a larger system of which the system is a part, to implement the functionality disclosed herein, such as a computer system or computer system service that does not employ virtualization and instead provisions computing resources on dedicated or shared computers/servers and/or other physical devices.

The serverless compute service 1000C is a network service that allows users to execute code (which might be referred to herein as a "function") without provisioning or managing server computers in the system, or a larger system of which the system is a part. Rather, the serverless compute service 1000C can automatically run code in response to the occurrence of events. The code that is executed can be stored by the storage service 1000A or in another network accessible location.

In this regard, it is to be appreciated that the term "serverless compute service" as used herein is not intended to infer that servers are not utilized to execute the program code, but rather that the serverless compute service 1000C enables code to be executed without requiring a user to provision or manage server computers. The serverless compute service 1000C executes program code only when needed, and only utilizes the resources necessary to execute the code. In some configurations, the user or entity requesting execution of the code might be charged only for the amount of time required for each execution of their program code.

The system, or a larger system of which the system is a part, can also include a cryptography service 1000D. The cryptography service 1000D can utilize storage services of the system, or a larger system of which the system is a part, such as the storage service 1000A, to store encryption keys in encrypted form, whereby the keys can be usable to decrypt user keys accessible only to particular devices of the cryptography service 1000D. The cryptography service 1000D can also provide other types of functionality not specifically mentioned herein.

The system, or a larger system of which the system is a part, in various configurations, also includes an authentication service 1000E and a policy management service 1000F. The authentication service 1000E, in one example, is a computer system (i.e., collection of computing resources 1000B) configured to perform operations involved in authentication of users or customers. For instance, one of the services shown in FIG. 10 can provide information from a user or customer to the authentication service 1000E to receive information in return that indicates whether or not the requests submitted by the user or the customer are authentic.

The policy management service 1000F, in one example, is a network service configured to manage policies on behalf of users or customers of the system, or a larger system of which the system is a part. The policy management service 1000F can include an interface (e.g. API or GUI) that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The system, or a larger system of which the system is a part, can additionally maintain other network services based, at least in part, on the needs of its customers. For instance, the system, or a larger system of which the system is a part, can maintain a deployment service 1000G for deploying program code in some configurations. The deployment service 1000G provides functionality for deploying program code, such as to virtual or physical hosts provided by the on-demand computing service 1000B. Other services include, but are not limited to, database services, object-level archival data storage services, and services that manage, monitor, interact with, or support other services. The system, or a larger system of which the system is a part, can also be configured with other network services not specifically mentioned herein in other configurations.

Figure 11:
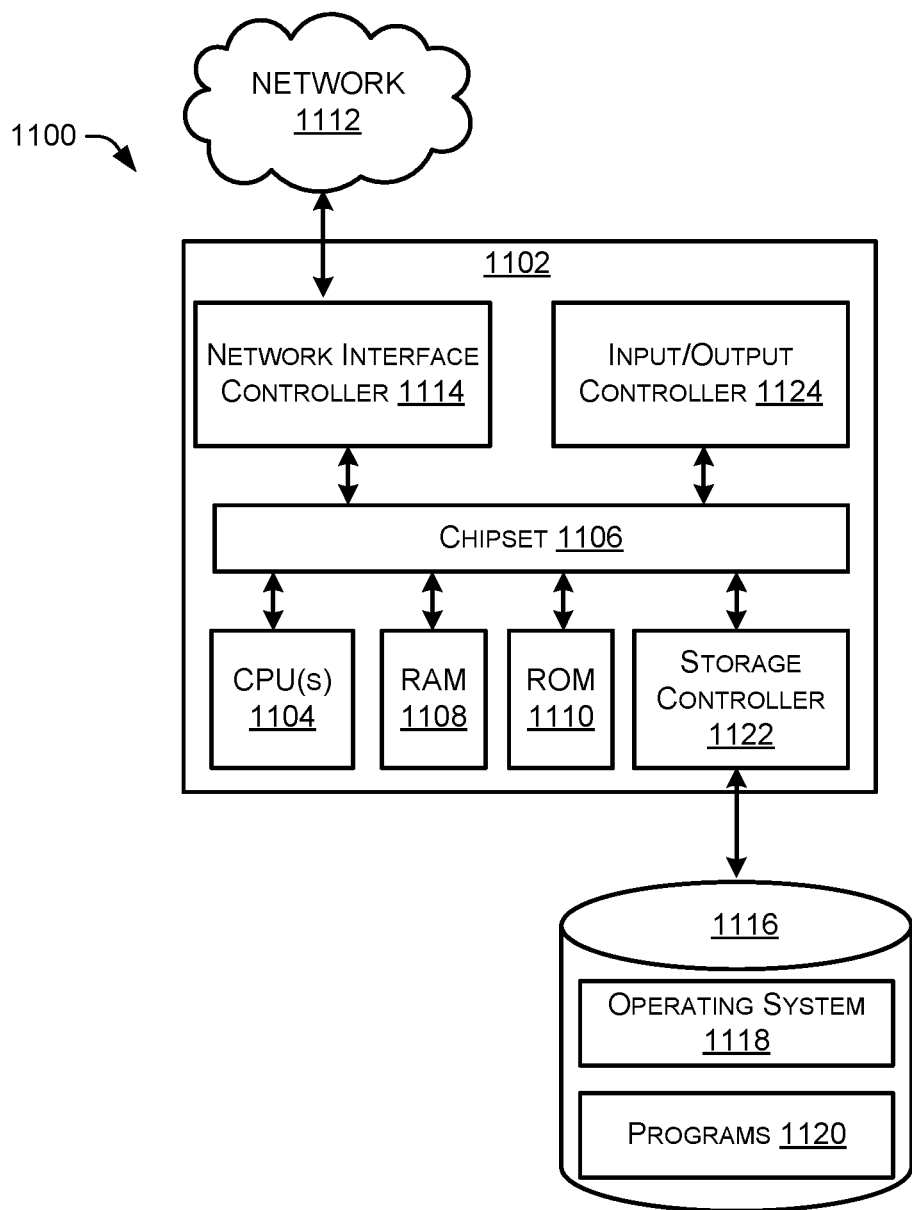
FIG. 11 is a computer architecture diagram showing an illustrative computer hardware architecture for implementing a computing device that can be utilized to implement aspects of the various technologies presented herein.

FIG. 11 shows an example computer architecture for a computer 1100 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein. The computer 1100 may represent architecture for a naming service, a concentrator, a reader, and/or other devices described herein.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 1112. The chipset 1106 can include functionality for providing network connectivity through a NIC 1114, such as a gigabit Ethernet adapter. The NIC 1114 is capable of connecting the computer 1100 to other computing devices over the network 1112. It should be appreciated that multiple NICs 1114 can be present in the computer 1100, connecting the computer to other types of networks and remote computer systems.

The computer 1100 can be connected to a mass storage device 1116 that provides non-volatile storage for the computer. The mass storage device 1116 can store an operating system 1118, programs 1120, and data, which have been described in greater detail herein. The mass storage device 1116 can be connected to the computer 1100 through a storage controller 1122 connected to the chipset 1106. The mass storage device 1116 can consist of one or more physical storage units. The storage controller 1122 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 can store data on the mass storage device 1116 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1116 is characterized as primary or secondary storage, and the like.

For example, the computer 1100 can store information to the mass storage device 1116 by issuing instructions through the storage controller 1122 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the mass storage device 1116 by detecting the physical states or characteristics of one or more particular locations within the physical storage units.

In addition to the mass storage device 1116 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned above, the mass storage device 1116 can store an operating system 1118 utilized to control the operation of the computer 1100. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1116 can store other system or application programs and data utilized by the computer 1100.

In one configuration, the mass storage device 1116 or other computer-readable storage media is encoded with computer-executable instructions which, when loaded into the computer 1100, transform the computer from a general-purpose computing system into a special-purpose computer capable of implementing the configurations described herein. These computer-executable instructions transform the computer 1100 by specifying how the CPUs 1104 transition between states, as described above. According to one configuration, the computer 1100 has access to computer-readable storage media storing computer-executable instructions which, when executed by the computer 1100, perform the various processes described above. The computer 1100 can also include computer-readable storage media for performing any of the other computer-implemented operations described herein.

The computer 1100 can also include one or more input/output controllers 1124 for receiving and processing input from a number of input devices, such as a keyboard, a mouse, a touchpad, a touch screen, an electronic stylus, or other type of input device. Similarly, an input/output controller 1124 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or can utilize an architecture completely different than that shown in FIG. 11.

Based on the foregoing, it should be appreciated that technologies for providing access policy and permissions services and generated access envelopes based on monitoring actions in complex data-intensive systems have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A method comprising:
    receiving, at an access policy automation service from an access policy automation service client configured at a computing resource, service request data associated with a request for access to a data processing service, wherein the service request data indicates a denial of the request for access to the data processing service;
    determining, by the access policy automation service and based on the service request data, a workflow operation associated with the request for access to the data processing service, a workflow associated with the workflow operation, the data processing service, and a user associated with the workflow, the workflow comprising a plurality of operations;
    determining, by the access policy automation service and based on the user, an access envelope associated with the user, wherein the access envelope comprises one or more service permissions associated with the user;
    retrieving, by the access policy automation service, the access envelope from an access envelope data store;
    generating, by the access policy automation service, a service permission allowing the user to access the data processing service;
    modifying, by the access policy automation service, the access envelope to include the service permission in the one or more service permissions to generate a modified access envelope; and
    storing, by the access policy automation service, the modified access envelope in the access envelope data store.

2. The method of claim 1, further comprising:
    receiving, at the access policy automation service from an access management system, a second request for one or more recommended service permissions for an access role associated with the workflow;
    determining, based on the second request for the one or more recommended service permissions, the workflow;
    determining, based on the workflow, the modified access envelope;
    retrieving the one or more service permissions from the modified access envelope; and
    transmitting, from the access policy automation service to the access management system, the one or more service permissions.

3. The method of claim 1, further comprising:
    determining that an execution of the workflow has been completed;

determining that a second service permission in the one or more service permissions of the modified access envelope was not applied during the execution of the workflow; and modifying the modified access envelope to remove the second service permission from the one or more service permissions.

4. A method comprising:

determining, at an access policy automation service, a request for access to a computing service generated by a system control plane;

determining a principal associated with the request for access to the computing service;

determining an access envelope associated with the principal;

generating, based at least in part on the request for access to the computing service and the principal, a first permission allowing access to the computing service for the principal;

modifying the access envelope to include the first permission;

detecting a termination of a workflow associated with the access envelope;

determining that a second permission allowing access to a second computing service for the principal was not applied during the workflow; and modifying the access envelope to remove the second permission.

5. The method of claim 4, wherein the request for access to the computing service comprises a second request for data processing of a dataset; and wherein the method further comprises:

determining a third request for access to the dataset from a computing resource generated by the computing service;

generating, based at least in part on the third request for access to the dataset and the principal, a third permission allowing the principal access to the dataset; and modifying the access envelope to include the third permission.

6. The method of claim 4, further comprising:

receiving a second request for permissions for an access role;

determining that the principal is associated with the access role; and based at least in part on determining that the principal is associated with the access role, providing a response to the second request, the response comprising one or more permissions from the access envelope.

7. The method of claim 4, wherein determining the request for access to the computing service comprises detecting a denial of the request for access to the computing service.

8. The method of claim 4, further comprising:

detecting an initiation of the workflow associated with the access envelope; and at least partially in response to detecting the initiation of the workflow, determining the request for access to the computing service.

9. The method of claim 4, wherein the request for access to the computing service requests instantiation of a virtual machine by the computing service to perform one or more machine learning operations.

10. The method of claim 4, further comprising:

determining a second request for access to a second computing service generated by a third computing service;

determining that the principal is associated with the second request for access to the second computing service;

generating, based at least in part on the second request for access to the second computing service and the principal, a third permission allowing the principal access to the second computing service; and modifying the access envelope to include the third permission.

11. The method of claim 4, further comprising:

determining, based at least in part on computing service request data associated with the access envelope, that a third permission included in the access envelope has not been applied; and based at least in part on determining that the third permission has not been applied, modifying the access envelope to remove the third permission.

12. The method of claim 11, wherein determining that the third permission has not been applied comprises determining that a threshold number of iterations of a second workflow associated with the access envelope have been completed without detecting a second request for a second computing service associated with the third permission.

13. The method of claim 11, wherein determining that the third permission has not been applied comprises determining that a threshold amount of time has passed without detecting a second request for a second computing service associated with the third permission.

14. A system comprising:

one or more processors; and one or more computer-readable media storing computer-executable instructions that, when executed by the one or more processors, cause an access policy automation service component to perform operations comprising:

detecting a request for access to a computing service;

detecting a response to the request for access to the computing service;

determining an access envelope associated with the request for access to the computing service;

determining that the response comprises a denial of the request for access to the computing service;

based at least in part on determining that the response comprises the denial of the request for access to the computing service, generating an access rule allowing access to the computing service by a principal associated with the request for access to the computing service; and modifying the access envelope to include the access rule.

15. The system of claim 14, wherein detecting the request for access to the computing service comprises detecting an application programming interface call issued by a machine-learning system control plane to the computing service.

16. The system of claim 14, wherein detecting the request for access to the computing service comprises receiving, from an access policy automation service client configured at a second computing service, an indication of an application programming interface call issued by the second computing service to the computing service.

17. The system of claim 14, wherein the operations further comprise:

receiving a second request for one or more recommended access rules for an access role;

determining the access envelope based at least in part on the second request for the one or more recommended access rules; and providing a response to the second request for the one or more recommended access rules, the response comprising one or more access rules from the access envelope.

18. The system of claim 17, wherein determining the access envelope based at least in part on the second request for the one or more recommended access rules comprises:

determining the principal based at least in part on the second request for the one or more recommended access rules; and determining that the principal is associated with the access envelope.

19. The system of claim 17, wherein determining the access envelope based at least in part on the second request for the one or more recommended access rules comprises:

determining a workflow operation based at least in part on the second request for the one or more recommended access rules; and determining that the workflow operation is associated with the access envelope.

20. The system of claim 14, wherein detecting the request for access to the computing service comprises detecting a second request to retrieve data stored at a computing resource associated with the computing service.

\* \* \* \* \*